(12) United States Patent
Larsen

(10) Patent No.: US 9,097,365 B2
(45) Date of Patent: Aug. 4, 2015

(54) MICRO-VALVE ASSEMBLY

(71) Applicant: ALPS Electric Co., Ltd., Tokyo (JP)

(72) Inventor: James Larsen, Farmington Hills, MI (US)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/212,495

(22) Filed: Mar. 14, 2014

(65) Prior Publication Data

US 2014/0265492 A1  Sep. 18, 2014

Related U.S. Application Data

(60) Provisional application No. 61/799,349, filed on Mar. 15, 2013.

(51) Int. Cl.
| | |
|---|---|
| *A47C 7/02* | (2006.01) |
| *F16K 99/00* | (2006.01) |
| *B60N 2/00* | (2006.01) |
| *G05D 16/20* | (2006.01) |
| *A47C 7/14* | (2006.01) |

(52) U.S. Cl.
CPC .............. *F16K 99/0042* (2013.01); *B60N 2/00* (2013.01); *F16K 99/0028* (2013.01); *G05D 16/2053* (2013.01); *A47C 7/14* (2013.01)

(58) Field of Classification Search
CPC .............. F16K 31/008; F16K 99/0028; F16K 99/0042; G05D 16/2073; A47C 7/14
USPC ........ 297/284.3, 284.1, 284.6, 463.1, 452.41, 297/DIG. 3, DIG. 8; 137/885, 899, 596.13, 137/596.1, 596, 625.2, 872; 251/22; 601/148, 152
See application file for complete search history.

(56) References Cited

U.S. PATENT DOCUMENTS

| | | | | |
|---|---|---|---|---|
| 5,152,579 | A * | 10/1992 | Bishai ........................ | 297/284.6 |
| 5,637,076 | A * | 6/1997 | Hazard et al. ..................... | 601/5 |
| 5,893,609 | A * | 4/1999 | Schmidt ...................... | 297/284.6 |
| 5,960,760 | A * | 10/1999 | Wang et al. ................. | 123/188.3 |
| 7,484,528 | B2 * | 2/2009 | Beyerlein et al. ........ | 137/596.17 |
| 8,794,707 | B2 * | 8/2014 | Bocsanyi et al. ........ | 297/452.41 |
| 2005/0067868 | A1 * | 3/2005 | Kern et al. .................. | 297/284.6 |
| 2006/0061315 | A1 * | 3/2006 | Schmidt et al. ............ | 318/568.1 |
| 2012/0143108 | A1 * | 6/2012 | Bocsanyi et al. ............. | 601/148 |
| 2014/0232155 | A1 * | 8/2014 | Bocsanyi ................... | 297/284.6 |

\* cited by examiner

*Primary Examiner* — Chi Q Nguyen
(74) *Attorney, Agent, or Firm* — Brinks Gilson & Lione

(57) ABSTRACT

A micro-valve assembly for incorporation into a vehicle seat having an inflatable bladder. The micro-valve assembly includes a first housing that cooperates with two micro-valve sub-assemblies to define a high and low pressure supply chamber. A second housing cooperates with both of the first and second micro-valve subassemblies to define a primary pressure chamber. Each of the micro-valve sub-assemblies further includes a valve port extending therethrough with a MEMS micro-valve positioned in the valve port. The MEMS micro valves are actuatable between open and closed positions to respectively permit and prohibit fluid communication between the primary pressure chamber and high and low pressure supply chambers.

5 Claims, 4 Drawing Sheets

MICRO-VALVE ASSEMBLY

CROSS REFERENCE TO RELATED APPLICATION

This application claims the benefit of U.S. provisional patent application No. 61/799,349, filed on Mar. 15, 2013, the entire contents of which is herein incorporated by reference.

BACKGROUND

1. Field of the Invention

The present invention generally relates to the micro-valve assembly, and more specifically to a micro-valve assembly that may be used to control air pressure directed to comfort bladders used in automotive seating applications.

2. Description of Related Technology

People often spend a significant amount of time seated each day. This sitting occurs not only on the job or at home, also while traveling in a vehicle, such as an automobile, truck or motorcycle. Often, when traveling, the seat of the vehicle has no adjustability for the comfort of the seat's occupant, the sizes of which can vary widely from occupant to occupant. As a result, the occupant may become uncomfortable in the seat, and the seat may contribute to fatigue, stiffness or soreness in the occupant after an extended ride in the vehicle.

To combat these problems, seat manufacturers have designed their seats to have increased adjustability. One known designed to increase the adjustability, and therefore the comfort, the vehicle seat is to provide one or more pneumatically inflatable bladders within various parts of the seat. By increasing or decreasing the degree to which the bladder, or each bladder, is inflated, the comfort of the seat can be customized by and for each particular occupant.

To control the inflation and deflation of these bladders, valve assemblies are coupled to the bladders, generally between a pressurized air source and the bladders. These valve assemblies, however, tend to be large and complicated in their construction. The weight and size of the valve assemblies contribute to the overall weight of the vehicle and increase packaging requirements for the incorporation of these comfort features into the vehicle seat. Automotive manufacturers prefer to decrease both of these constraints, thereby allowing for lighter weight and thus better fuel economy and roomier feeling vehicles, both of which are desirable by consumers.

SUMMARY

In one aspect, the present invention provides a micro-valve assembly comprising the first housing divided into a high pressure supply chamber and a low pressure supply chamber, the high pressure supply chamber coupled to a high pressure port and the low pressure supply chamber coupled to a low pressure port; a second housing coupled to the first housing, the second housing defining a primary pressure chamber, the primary pressure chamber coupled to an outlet port configured to provide a pressure to a location outside of the micro-valve assembly; at least two micro-valve sub-assemblies, each of the micro-valve sub-assembly further comprising a sub-housing including a flange extending outwardly therefrom, a valve port extending through the sub-housing, and a MEMs micro-valve positioned in the valve port; the at least two micro-valve sub-assemblies being mounted by the flanges to one of the first and second housings wherein one of the sub-housings and flanges separates the primary chamber from the high pressure supply chamber and the other of the sub-housings and flanges separates the primary chamber from the low pressure chamber, and wherein one of the valve ports connects the high pressure supply chamber to the primary pressure chamber and the other of the valve ports connects the low pressure supply chamber to the primary pressure chamber; each of the MEMs micro-valves being actuatable between an open position and a closed position, the open position permitting fluid communication between the primary pressure chamber and high and low pressure supply chambers, the closed position prohibiting fluid communication between the primary pressure chamber and high and low pressure supply chambers; and a PC board positioned in the primary pressure chamber and having an air pressure sensor mounted thereon, the PC board being connected to terminals of each of the MEMs micro-valves by solderless connections to provide signals to the MEMs micro-valves causing actuation thereof In another aspect, the flanges of the sub-housings are mounted to the first housing.

In an additional aspect, the flanges of the sub-housings are mounted to steps defined in the first housing.

In a further aspect, the flanges of the sub-housing are ultra-sonically welded to one of the first and second housings.

In still another aspect, the flanges of the sub-housing are ultra-sonically welded to steps defined in one of the first and second housings.

An additional aspect, the steps are defined in the first housing.

In yet a further aspect, first housing is ultrasonically welded to the second housing.

In still another aspect, the MEMs micro-valves are connected to the PC board by clipped connections.

In a further aspect, the solderless connections are clipped connections.

In an additional aspect, the solderless connections are frictional engagements between the terminals of the MEMs micro-valves and the PC board.

In yet a further aspect, micro-valve assembly is incorporated into a vehicle seat.

In another aspect of the invention, a micro-valve assembly is provided having a first housing and a first micro-valve sub-assembly cooperating to define a high pressure supply chamber that is coupled to a high pressure air source; the first housing cooperating with a second micro-valve sub-assembly to define a low pressure supply chamber that is coupled to a low pressure air source; a second housing cooperating with both the first and second micro-valve subassemblies to define a primary pressure chamber, an outlet port from the primary pressure chamber being coupled to an inflatable bladder; each of the micro-valve sub-assemblies further comprising valve port extending therethrough and having a MEMs micro-valve positioned in the valve port, the micro-valve sub-assemblies being mounted to a printed circuit board (PCB) that is positioned in the primary pressure chamber and has an air pressure sensor mounted thereon, the PC board being connected to the MEMs micro-valves by solderless connections and the MEMs micro-valves being actuatable between an open and closed positions where fluid communication between the primary pressure chamber and high and low pressure supply chambers is respectively permitted and prohibited.

In a further aspect, the micro-valve subassembly is connected to the first housing by an ultrasonic weld.

In an additional aspect, the ultrasonic weld is provided between a flange extending outward from a sub-housing of the micro-valve subassembly and the first housing.

In still further aspect, the first housing is connected to the second housing by an ultrasonic weld.

In another aspect of the invention, a seat assembly for an automotive vehicle is provided in which the seat assembly includes a cushion and a backrest, one of the cushion and the backrest including an inflatable bladder therein; a high pressure source coupled to the bladder to provide a high relative pressure to the bladder causing inflation of the bladder; a low pressure source coupled to the bladder to provide a low relative pressure to the bladder causing deflation of the bladder; a micro-valve assembly connected between the bladder and the high and low pressure sources, the micro-valve assembly having a first housing cooperating with a first micro-valve sub-assembly to define a high pressure supply chamber that is coupled to a high pressure air source, the first housing also cooperating with a second micro-valve sub-assembly to define a low pressure supply chamber that is coupled to a low pressure air source, a second housing cooperating with both the first and second micro-valve subassemblies to define a primary pressure chamber, an outlet port from the primary pressure chamber being coupled to the inflatable bladder, each of the micro-valve sub-assemblies further comprising valve port extending therethrough and having a MEMs micro-valve positioned in the valve port, the micro-valve sub-assemblies being mounted to a printed circuit board (PCB) that is positioned in the primary pressure chamber and has an air pressure sensor mounted thereon, the PC board being connected to the MEMs micro-valves by solderless connections and the MEMs micro-valves being actuatable between an open and closed positions where fluid communication between the primary pressure chamber and high and low pressure supply chambers is respectively permitted and prohibited.

In an additional aspect, the micro-valve subassembly is connected to the first housing by an ultrasonic weld.

In a further aspect, the ultrasonic weld is provided between a flange extending outward from a sub-housing of the micro-valve subassembly and the first housing.

In yet an additional aspect, the first housing is connected to the second housing by an ultrasonic weld.

In still further aspect, the solderless connections are clipped connections.

Further objects, features and advantages of this invention will become readily apparent to persons skilled in the art after a review of the following description, with reference to the drawings and claims that are appended to and form a part of this specification.

DETAILED DESCRIPTION

Figure 1:
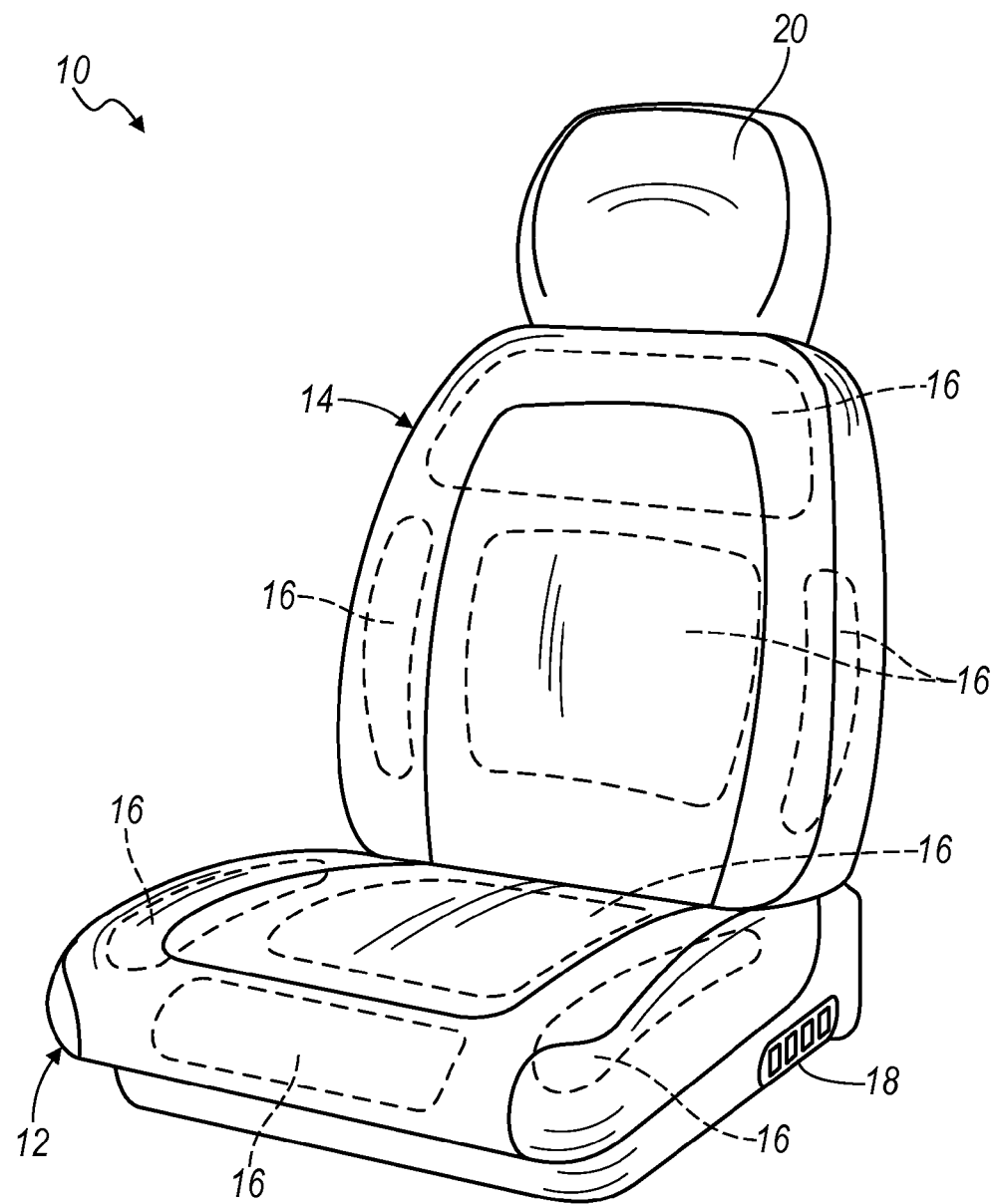
FIG. 1 is a perspective view of a vehicle seat, showing in phantom, a variety of alternate locations for the incorporation of a pneumatic bladder into the backrest and cushion of the vehicle seat.

Referring now to the drawings, a vehicle seat incorporating a micro-valve assembly in accordance with the principles of the present invention is illustrated FIG. 1 and designated at 10. As its primary components, the seat 10 includes a cushion 12 and a backrest 14 extending generally upwardly from the cushion 12.

Provided in one or both of the cushion 12 and the backrest 14 is one or more bladders 16 that can be pneumatically inflated as desired by the occupant of the seat 10. As seen in the figure, the bladders 16 can be alternatively provided in a variety of locations, including centrally in the cushion 12 and backrest 14, laterally therein, or at other locations. By adjusting the degree to which the bladders 16 are inflated, it is possible for the occupant to personalize their seating preferences and thereby provide enhanced comfort to the occupant. To facilitate the adjustment of the pressure within the bladders 16, appropriate controls 18 are provided in conjunction with the seat 10. The controls 18 may be provided along the side of the cushion 12 or maybe provided elsewhere within the vehicle. Generally, the controls 18 simply allow for the increasing or decreasing of pressure within the bladders 16, and in this regard, the controls 18 may be comprised of two pushbuttons, a positive button (+) for increasing the pressure and a negative button (−) for decreasing the pressure. Wow illustrated as having a plurality of bladder s16 in each of the cushion 12 and backrest 14, the subsequent description will only make reference to a single bladder 16 in the cushion 12 for simplicity and clarity, it being understood that the discussion naturally encompasses the inclusion of additional bladders 16 and various positioning of the bladders 16. While not illustrated in FIG. 1, a bladder 16 could also be incorporated within a headrest 20 of the seat 10.

Figure 2:
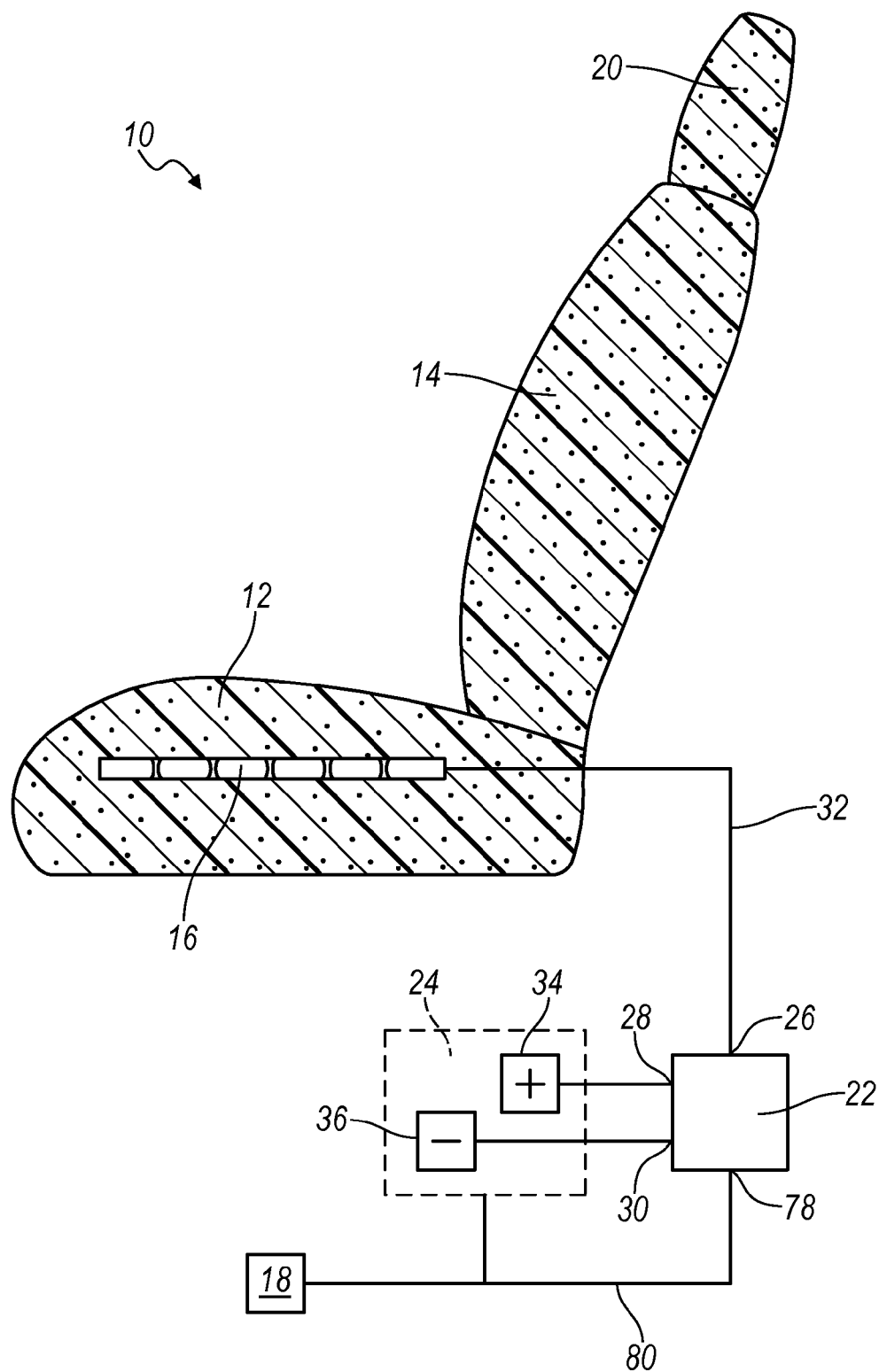
FIG. 2 is a cross-sectional diagrammatic view of the vehicle seat illustrating the bladder in the cushion in conjunction with elements utilized in controlling the inflation and deflation of the bladder.

As seen in FIG. 2, the bladder 16 is operably connected to a micro-valve assembly 22, which is in turn operably connected to a pressure source 24. The micro-valve assembly 22 includes three ports, namely an outlet port 26, the high pressure port 28 and a low pressure port 30. The outlet port 26 is coupled by a conduit 32 to the bladder 16. The conduit 32 therefore communicates a pressure medium, preferably air, to the bladder 16 allowing for either inflation or deflation, depending on the pressure of the medium in communication with the bladder 16.

The high pressure port 28 and low pressure port 30 are coupled to the pressure source 24. The pressure source 24 may itself include separate high and low pressure sources 34, 36, respectively coupled to the high pressure port 28 and the low pressure port 30, or a switchable source capable of operating as both the high and low pressure sources. When coupled to the high pressure source 34 by the micro-valve assembly 22, the bladder 16 is caused to inflate under the influence of positive pressure. When coupled to the 36 by the micro-valve assembly 22, the bladder 16 is caused to deflate as a result of the lower relative pressure of the low pressure source 36, which may be, but does not necessarily have to be, a negative pressure.

Figure 3:
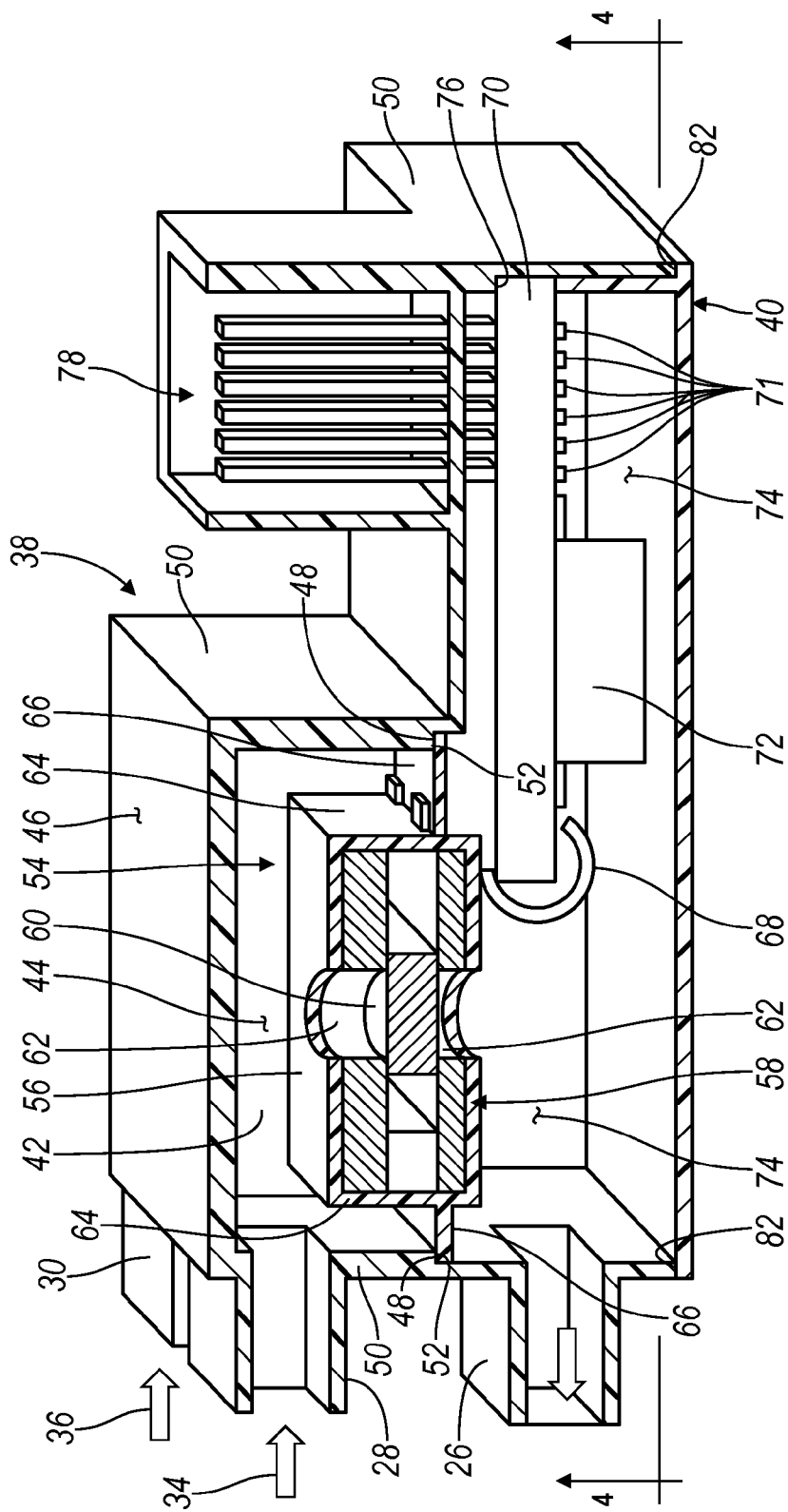
FIG. 3 is a cross-sectional diagrammatic view through a micro-valve assembly embodying the principles of the present invention.
Figure 4:
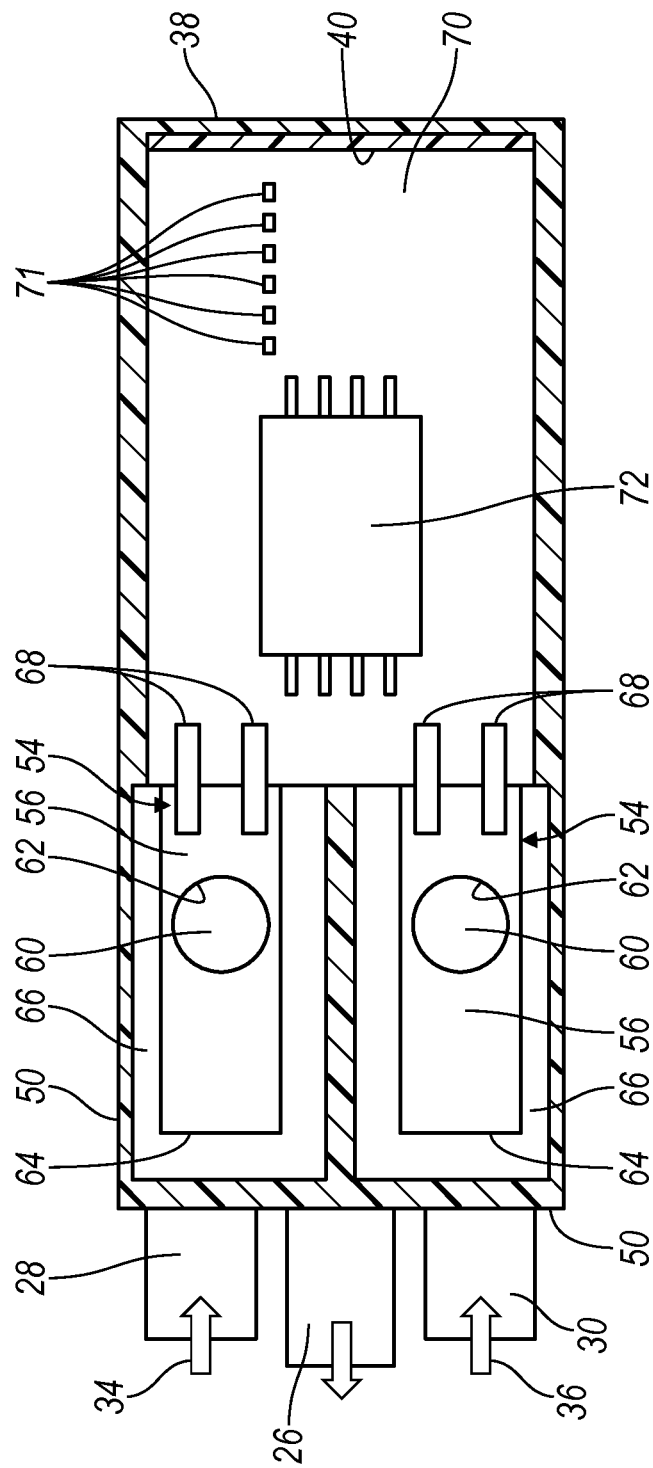
FIG. 4 is a cross-sectional diagrammatic view, generally taken along line 4-4 in FIG. 3, of the micro-valve assembly.

Referring now to FIGS. 3 and 4, a preferred construction of the micro-valve assembly 22, and embodying the principles of the present invention, is diagrammatically illustrated therein. As will be appreciated by those skilled in the art, the diagrammatic illustration of these figures is not the scale.

As seen therein, the micro-valve assembly 22 includes a first or upper housing 38 that is connected to a second or lower housing 40. As used herein, terms having directional connotations, such as upper and lower, in front and behind, are used to indicate the direction illustrated in the drawing of FIG. 3, in which an upper element is more towards the top of the page while a lower element is more towards the bottom of the page. An outlet located behind another element would therefore indicate a direction into the page.

The upper housing 38 is divided by septum or wall 42 into two chambers, a high-pressure supply chamber 44 and a low-pressure supply chamber 46. As seen in FIG. 3, the high-pressure supply chamber 44 is exposed, with its contents viewable. The low-pressure supply chamber 46 lies immediately behind the high-pressure supply chamber 44 and is designated in phantom.

Shoulders 48 provided in sidewalls 50 of the upper housing 38 define a lip 52 that is used to further define the lowermost extents of the high-pressure supply chamber 44 and the low-pressure supply chamber 46. In this regard, two micro-valve subassemblies 54 are engaged with the lip 52 so as to define these lowermost extents. Only one of the micro-valve subassemblies 54 is illustrated in FIG. 3. Both micro-the subassemblies 54, however, are seen in FIG. 4.

The micro-valve subassemblies 54 are identical in construction to one another and, therefore, only one of the micro-valve subassemblies 54 need be explained. It should be understood, however, each of the micro-valve subassemblies 54 is associated with either the high-pressure supply chamber 44 were the low-pressure supply chamber 46. When referring to a micro-valve subassembly 54, or components thereof, associated with a particular supply chamber 44, 46 the terms "high" and "low" are used to delineate between the two micro-valve subassemblies 54.

The micro-valve subassembly 54 includes a sub-housing 56 within which is retained a microelectromechanical valve 58. The sub-housing 56, which is hereinafter referred to as a MEMS micro-valve 58. The MEMS micro-valve 58 is constructed using modified semiconductor device fabrication technologies, including deposition, patterning, etching (including wet, dry and plasma etching), micromachining (bulk and surface), electric discharge machining, bonding, metallization and other technologies, which are well known and need not be further discussed herein. The MEMS micro-valve 58 is also not limited to any particular configuration or construction, so long as the MEMS micro-valve 58 includes a member 60 that is actuatable, by control elements of the MEMS micro-valve 58, to move between closed and open positions where the member 60 prevents or permits fluid communication via a valve port 62 through the MEMS micro-valve 58 and the micro-valve subassembly 54. For this reason, the MEMS micro-valve 58 and its actuatable member 60 are only representatively shown in FIGS. 3 and 4.

Extending outwardly from the side walls 64 of the sub-housing 56 is a flange 66. The flange 66 extends from the side walls 64 a distance that enables the outer periphery of the flange 66 to engage and rest upon the lip 52 defined by the shoulders 48 of the upper housing's sidewalls 50. Preferably, the periphery of the flange 66 is ultra-sonically welded to the lip 52 thereby forming the lowermost wall defining the supply chamber 44, 46 with which it is associated. Pressure within the associated supply chamber 44, 46 is communicated through the micro-valve subassembly 54 via the previously mentioned valve port 62.

The micro-valve subassembly 54 further includes a solderless connection 68 that couples the micro-valve subassembly 54 to contacts of a printed circuit board (PCB) 70. In the illustrated embodiment, the solderless connection 68 is represented by way of spring clips 72 that allow the micro-valve subassembly 54 to be clipped, snapped or frictionally engaged with the PCB 70. Since the PCB 70 is connected to the micro-valve subassembly 54, with the attachment of the micro-valve subassembly 54 to the upper housing 38, the PCB 70 is located in a position below the micro-valve subassembly 54 and outside of supply chambers 44, 46. More specifically, the PCB 70 is located and isolated within a primary pressure chamber 74 that is cooperatively defined by the upper housing 38 and lower housing 40. To support PCB 70 within the primary pressure chamber 74, in addition to being connected to the micro-valve subassembly 54, and end of the PCB 70 may be supported by an additional shoulder 76 defined in one of the sidewalls 50 of the upper housing 38.

The PCB 70 includes the appropriate circuitry, devices and connector terminals 71 to provide appropriate signals to and from the PCB 70 so as to control operation of the micro-valve subassembly 54 and monitor pressure within the primary pressure chamber 74. With regard to the latter function, an air pressure sensor 72 is provided on the PCB 70 and likewise within the primary pressure chamber 74 with the PCB 70. To communicate with the controls 18 of the seat 10, a connector terminal 78 may be provided from the exterior of the upper housing 38 so as to receive a plug connector of a wire harness 80 coupled to the controls 18. Contacts 82 within the terminal 78 extend through the exterior wall of the upper housing 38 so as to engage the connector terminals 71 provided on the PCB 70.

The lower housing 40 is connected to the upper housing 38 at its periphery or flanges, generally designated at 82, which are provided in a construction that enables ultrasonic welding of the lower housing 40 to the upper housing 38. With this construction, the lower housing 40 cooperates with the upper housing 38 and the micro-valve subassembly 54 to define the primary pressure chamber 74 and isolate the air pressure sensor 72 therein.

Depending on the specific construction of the upper and lower housings 38, 40, the outlet port 26 may be provided in connection with either of the housings 38, 40. In the illustrations of FIGS. 3 and 4, the outlet port 26 is formed in one of the sidewalls of the upper housing 38.

Upon a command to inflate the bladder 16 received from the occupant or the vehicle, pressurized air is provided from the high-pressure source 34 through the high-pressure port 28 and into the high-pressure supply chamber 44 of the micro-valve subassembly 54. The PCB 70 causes the member 60 of the MEMS micro-valve 58 to move to a position where the member permits high-pressure air to flow through the valve port 62 from the high-pressure supply chamber 44 into the primary pressure chamber 74. The PCB 70 simultaneously causes the member 60 of the MEMS micro-valve 58 associated with the low-pressure supply chamber 46 to prohibit the flow there through the valve port 62 associated therewith. Upon the bladder 16 achieving the desired degree of inflation, which may be determined by the pressure sensor 72 registering a predetermined pressure within the primary pressure chamber 74, the PCB 70 causes the member 60 of the MEMS micro-valve 58 associated with the high-pressure supply chamber 44 to close and prohibit the further flow of air between the high-pressure supply chamber 44 in the primary pressure chamber 74.

To reduce the pressure in the bladder 16, the MEMS micro-valve 58 associated with the high pressure supply chamber 44 is kept closed by the PCB 70 and the member 60 of the MEMS micro-valve 58 associated with the low-pressure supply chamber 46 is moved to its open position by the PCB 70. Since the low-pressure supply chamber 46 is coupled to the low-pressure source 36, air will flow from the bladder 16 through the outlet port 26 into the primary pressure chamber 74, and subsequently through the valve port 62 into the low-pressure supply chamber 46. Once the bladder 16, and therefore the primary pressure chamber 74, reach the desired pressure, which again may be sensed by the air pressure sensor 72, PCB 70 causes the member 60 of the MEMS micro-valve 58 associated with the low-pressure supply chamber 46 to prevent further communication through the valve port 62.

While the embodiment described has been utilized with a single bladder 16 having a single chamber therein, it will be appreciated that the micro-valve assembly 22 is scalable and can be readily reconfigured for use with multiple bladders 16 and bladders 16 having multiple chambers. This can be achieved by providing additional high and low-pressure supply chambers, as well as primary pressure chambers, within the upper and lower housings, or by providing multiple micro-valve assemblies 22 an associated valve pack.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A seat assembly for an automotive vehicle, the seat assembly comprising:
   a cushion and a backrest, one of the cushion and the backrest including an inflatable bladder therein;
   a high pressure source coupled to the bladder to provide a high relative pressure to the bladder causing inflation of the bladder;
   a low pressure source coupled to the bladder to provide a low relative pressure to the bladder causing deflation of the bladder;
   a micro-valve assembly connected between the bladder and the high and low pressure sources, the micro-valve assembly having a first housing cooperating with a first micro-valve sub-assembly to define a high pressure supply chamber that is coupled to a high pressure air source, the first housing also cooperating with a second micro-valve sub-assembly to define a low pressure supply chamber that is coupled to a low pressure air source, a second housing cooperating with both the first and second micro-valve subassemblies to define a primary pressure chamber, an outlet port from the primary pressure chamber being coupled to the inflatable bladder, each of the micro-valve sub-assemblies further comprising valve port extending therethrough and having a MEMs micro-valve positioned in the valve port, the micro-valve sub-assemblies being mounted to a printed circuit board (PCB) that is positioned in the primary pressure chamber and has an air pressure sensor mounted thereon, the PC board being connected to the MEMs micro-valves by solderless connections and the MEMs micro-valves being actuatable between an open and closed positions where fluid communication between the primary pressure chamber and high and low pressure supply chambers is respectively permitted and prohibited.

2. The seat assembly of claim 1, wherein the micro-valve subassembly is connected to the first housing by an ultrasonic weld.

3. The seat assembly of claim 2, wherein the ultrasonic weld is provided between a flange extending outward from a sub-housing of the micro-valve subassembly and the first housing.

4. The seat assembly of claim 1, wherein the first housing is connected to the second housing by an ultrasonic weld.

5. The seat assembly of claim 1, wherein the solderless connections are clipped connections.

* * * * *